United States Patent Office 3,577,246
Patented May 4, 1971

3,577,246
REFRACTORY SHAPE WITH PREREACTED GRAIN
Joseph E. Neely, Los Gatos, Calif., assignor to Kaiser Aluminum & Chemical Corporation, Oakland, Calif.
No Drawing. Filed Nov. 25, 1968, Ser. No. 778,764
Int. Cl. C04b 35/42
U.S. Cl. 106—59
8 Claims

ABSTRACT OF THE DISCLOSURE

A refractory shape of lower porosity and enhanced high temperature strength is made from coarse refractory grain retained on a 100 mesh screen and prereacted magnesia-chrome grain passing a 100 mesh screen by incorporating from about 0.5% to about 15%, by weight of the total composition, finely divided alumina.

BACKGROUND OF THE INVENTION

This invention concerns refractory shapes and particularly such shapes containing magnesia and chrome.

It has long been known to make refractory shapes from mixtures of magnesia and chrome ore, these two materials being admixed in sized granular form and formed into shapes which can then be fired at elevated temperatures. High temperature firing results both in a physical sintering leading to increased density and in increased strength and also in a chemical reaction between the constituent materials. Although such refractory shapes have found widespread use, they have not fully succeeded in satisfying the continuing demand for better properties in refractory materials, for example lower porosity and better strength at elevated temperatures.

Although the precise reasons for the limits on the properties obtainable with such prior art refractories are not known with certainty, it is believed that certain of their shortcomings can be traced to a lack of complete chemical equilibrium after firing in such refractories made from mixtures of materials. In other words, it has been felt that the chemical, as well as the physical, reactions are not completed during the firing operations but continue to occur during use of the refractories.

Accordingly, it has been proposed to prereact magnesia and chrome ore to form a chemically stable refractory grain which can then be used to make refractory shapes. This prereaction can, for example, be carried out by fusing the materials to form a relatively homogeneous mass which is then cooled and crushed to make sized refractory grain. This prereacted grain is then formed into refractory shapes which can, if desired, be subsequently fired to effect the physical reaction of sintering and densification. Also, the magnesia and chrome ore materials can be sintered together, for example in a rotary kiln, without any substantial, or at least not complete, fusion of the materials to form a chemically stabilized grain. Again, this grain is used to make refractory shapes in the usual manner.

While this procedure of prereacting magnesia and chrome ore to form grain has met with success in the industry, there is still a demand from the users of refractories for still higher strengths, particularly at elevated temperatures, in refractory shapes. Accordingly, the industry continues to search for a refractory which is stronger at the elevated temperatures of use.

SUMMARY OF THE INVENTION

It has now been found, according to this invention, that an improved refractory shape is made from prereacted chrome-magnesia or magnesia-chrome refractory grain when there is included in the refractory composition from which the shape is made from about 0.5%, to about 15%, by weight of the total composition, finely divided alumina ($Al_2O_3$). More specifically, the composition comprises from about 60% to about 80% by weight of prereacted grain retained on a 100 mesh screen and from about 20% to about 40% by weight of a fine fraction of refractory grain passing a 100 mesh screen, said fine fraction comprising from about 0.5% to about 15%, by weight of the total composition, alumina passing a 325 mesh screen, the amount of alumina retained on a 325 mesh screen and passing a 100 mesh screen being not greater than one-fourth the amount of alumina passing a 325 mesh screen, the remainder of the —100 mesh fraction, being prereacted grain. The prereacted grain is made by reacting from about 15% to about 90% magnesia with from about 10% to about 85% chrome ore, either by sintering or by fusing or any other suitable method. The —100 mesh prereacted grain will usually be of the same composition as the +100 mesh prereacted grain, but this is not essential to the invention.

Alternatively, other, compatible refractory grain, for example periclase, alumina, magnesium aluminate spinel and the like, can be substituted for all or part of the prereacted periclase-chrome grain retained on a 100 mesh screen. Preferably, when such substitution is made it is confined to that portion of the grain retained on a 40 mesh screen. In other words, the finely divided portion of the composition, i.e., the —100 mesh fraction, and preferably the —40 mesh fraction, which forms the matrix of the fired refractory, is all prereacted grain, together with the added alumina.

DETAILED DESCRIPTION

The prereacted grain used in the practice of this invention can be made by admixing the desired proportions of magnesia and chrome ore and then reacting them either by sintering, for example in a rotary kiln or a shaft kiln, or by fusing them, as is well known in the art. The magnesia used can be from either a natural magnesite or a natural or synthetic brucite or magnesium hydroxide produced, for example, by reaction of a base such as lime, cuastic soda, ammonia, or the like, with a magnesium chloride solution such as sea water or natural brine. The chrome ore used can be any of various such materials found naturally in various parts of the world and can also be a beneficiated form of such material with a lower silica content than is found in the naturally occurring material. After being reacted, the resulting grain is crushed to brickmaking grade sizes, as is well known in the art.

The added finely divided alumina can be any form of such material, for example the tabular alumina of commerce or one of the more active forms of calcined alumina. While an alumina-yielding material such as aluminum hydroxide can be used, it will generally be found preferable to use an alumina consisting solely of $Al_2O_3$ (together with, of course, normal impurities). While it is preferred that all the alumina used in the practice of this invevntion pass a 325 mesh screen, for economic reasons it will generally be found more practical to use alumina a minor portion of which is retained on a 325 mesh screen. In other words, at least 80% of the finely divided alumina used in the practice of this invention passes a 325 mesh screen. Of course, as stated above, substantially all of the alumina used will pass a 100 mesh screen.

In making refractory shapes according to this invention, there can advantageously be included in the mix a temporary bond or binder, for example a lignin sulfonate binder, to impart strength to the shapes prior to the final firing operation, as is well known in this art.

Shapes made according to this invention are, as is customary, fired, for example to a temperature of at least 1600° C., and preferably to at least 1700° C.

Example I

As an example of the practice of this invention, a prereacted grain was made by admixing sufficient calcined magnesia and Masinloc chrome ore concentrates to yield an overall chemical composition of approximately 60% MgO, and the admixture fired to a temperature of 1900° C. in a rotary kiln. The calcined magnesia used showed the following typical chemical analysis: 1.1% CaO, 0.4% $SiO_2$, 0.1% $Al_2O_3$, 0.3% $Fe_2O_3$, and (by difference) 98.1% MgO. The chrome ore concentrates used showed the following typical chemical analysis: 16.8% MgO, 0.4% CaO, 2.9% $SiO_2$, 30.1% $Al_2O_3$, 15.2% $Fe_2O_3$ and 34.6% $Cr_2O_3$. The resulting prereacted grain showed the following chemical analysis: 1.6% $SiO_2$, 7.1% $Fe_2O_3$, 12.8% $Al_2O_3$, 15.6% $Cr_2O_3$, 0.7% CaO and 62.2% MgO (by difference). The prereacted grain was crushed and sized and 97 parts of it, 72.3 parts of which passed a 4 mesh screen and were retained on a 100 mesh screen and 24.7 parts of which passed a 100 mesh screen, were mixed with 2 parts by weight ball mill alumina, all of which passed a 100 mesh screen and 90% of which passed a 325 mesh screen, and one part of a temporary lignin sulfonate binder in 3.5 parts water. The alumina used contained 2% $TiO_2$ as a sintering agent. The mixture was formed into refractory brick about 9" x 4½" x 3" which were fired at 1700° C. for 6 hours. The fired brick had an average density of 196 lbs. per cubic foot, an average porosity of 14.9 volume percent, and a modulus of rupture of 3040 p.s.i. at 1260° C. and a 780 p.s.i. at 1482° C.

Example II

Eighty-nine parts of the same prereacted grain used in Example I, grade sized so that 73.5 parts passed a 4 mesh screen and were retained on a 100 mesh screen and 15.5 parts passed a 100 mesh screen, were admixed with 10 parts by weight of the alumina used in Example I and one part by weight of a temporary lignin sulfonate binder incorporated in 3.5 parts by weight water. The mixture was formed into shapes and fired as in Example I, the fired shapes having the following properties: bulk density 199 pounds per cubic foot, apparent porosity 16.8 volume percent, and modulus of rupture of 4265 p.s.i. at 1260° C., and of 1490 p.s.i. at 1482° C.

The brick of Examples I and II are to be compared with similar brick made entirely from the same prereacted grain in similar size proportions but with the added alumina replaced by a like proportion of prereacted grain finer than 100 mesh. These comparison brick had the following properties: 192 lbs./ft.³ density, 17.3 volume percent porosity, and modulus of rupture of 320 p.s.i. at 1482° C. and 1800 p.s.i. at 1260° C. It can be seen that the strengths at elevated temperatures of brick according to both Examples I and II were higher than those of brick made from the same prereacted grain to which no alumina had been added.

Thus, it can be seen that the addition of fine alumina in the amounts called for by this invention greatly enhances the high temperature strength of shapes made from prereacted magnesia-chrome grain.

In the specification and claims, percentages and parts are by weight unless otherwise indicated, except that porosities are expressed in volume percent. Mesh sizes referred to herein are Tyler standard screen sizes which are defined in Chemical Engineers' Handbook, John H. Perry, Editor-in-Chief, third edition, 1950, published by McGraw Hill Book Company, at page 963. For example, a 100 mesh screen opening corresponds to 147 microns, and 200 mesh to 74 microns. Analyses of mineral components are reported in the usual manner, expressed as simple oxides, e.g., MgO, $SiO_2$, although the components may actually be present in various combinations, e.g., as a magnesium silicate.

Having now described the invention,
What is claimed is:

1. A refractory composition consisting essentially of: (A) from about 60% to about 80%, by weight of the total composition, of coarse prereacted refractory grain retained on a 100 mesh screen and made by reacting from about 15% to about 90% by weight magnesia with from about 10% to about 85% chrome ore and (B) from about 20% to about 40%, by weight of the total composition, of fine refractory grain passing a 100 mesh screen, said fine grain consisting essentially of (i) from about 0.5% to about 15%, by weight of the total composition, alumina passing a 325 mesh screen, the amount of alumina retained on a 325 mesh screen being not more than one-fourth the amount of alumina passing a 325 mesh screen, and (ii) prereacted refractory grain made by reacting from about 15% to about 90% magnesia with from about 10% to about 85% chrome ore.

2. A refractory composition according to claim 1 wherein the prereacted grain in the fine fraction is of the same chemical composition as the prereacted grain in the coarse fraction.

3. A refractory composition according to claim 2 wherein all the prereacted grain contains about 60% MgO.

4. A refractory composition according to any one of claims 1, 2, and 3 wherein said prereacted grain is sintered grain.

5. A fired refractory shape made from a composition consisting essentially of: (A) from about 60% to about 80%, by weight of the total composition, of coarse prereacted refractory grain retained on a 100 mesh screen and made by reacting from about 15% to about 90% by weight magnesia with from about 10% to about 85% chrome ore and (B) from about 20% to about 40%, by weight of the total composition, of fine refractory grain passing a 100 mesh screen, said fine grain consisting essentially of (i) from about 0.5% to about 15%, by weight of the total composition, alumina passing a 325 mesh screen, the amount of alumina retained on a 325 mesh screen being not more than one-fourth the amount of alumina passing a 325 mesh screen, and (ii) prereacted refractory grain made by reacting from about 15% to about 90% magnesia with from about 10% to about 85% chrome ore.

6. A fired refractory shape according to claim 5 wherein the prereacted grain in the fine fraction is of the same chemical composition as the prereacted grain in the coarse fraction.

7. A fired refractory shape according to claim 6 wherein all the prereacted grain contains about 60% MgO.

8. A refractory shape according to any one of claims 5, 6 and 7 which has been fired to a temperature of at least 1700° C.

References Cited
UNITED STATES PATENTS

| | | | |
|---|---|---|---|
| 2,775,525 | 12/1956 | Austin et al. | 106—59 |
| 2,775,526 | 12/1956 | Austin et al. | 106—59 |
| 3,443,974 | 5/1969 | Martinet | 106—59 |

JAMES E. POER, Primary Examiner

U.S. Cl. X.R.

106—62, 65